United States Patent [19]
Berge et al.

[11] Patent Number: 5,677,373
[45] Date of Patent: Oct. 14, 1997

[54] PROCESS FOR PREPARING A DISPERSION AND FOR PREPARING POLYMER PARTICLES

[75] Inventors: Arvid Berge, Trondheim; Tom-Nils Nilsen, Ranheim; Jon-Olav Bjørgum, Flatåsen; John Ugelstad, Trondheim, all of Norway

[73] Assignee: Sinvent A/S, Trondheim, Norway

[21] Appl. No.: 182,055

[22] PCT Filed: Jul. 15, 1992

[86] PCT No.: PCT/NO92/00123

§ 371 Date: Apr. 22, 1994

§ 102(e) Date: Apr. 22, 1994

[87] PCT Pub. No.: WO93/02112

PCT Pub. Date: Feb. 4, 1993

[30] Foreign Application Priority Data

Jul. 16, 1991 [GB] United Kingdom ............... 9115372

[51] Int. Cl.$^6$ .................. C08L 61/06; C08K 3/00
[52] U.S. Cl. .............. 524/510; 523/406; 524/502; 524/507; 524/512; 525/139; 423/445 R
[58] Field of Search ............................ 524/509, 510, 524/500, 501, 507, 512

[56] References Cited

U.S. PATENT DOCUMENTS

| | | | |
|---|---|---|---|
| 4,361,676 | 11/1982 | Simpson | 525/118 |
| 4,539,348 | 9/1985 | Gajria | 523/510 |
| 4,686,260 | 8/1987 | Lindemann | 525/903 |
| 4,708,981 | 11/1987 | Zupancic | 525/59 |
| 4,711,913 | 12/1987 | Tateosian | 522/14 |

FOREIGN PATENT DOCUMENTS

| | | |
|---|---|---|
| 0 003 905 | 9/1979 | European Pat. Off. . |
| 0 190 886 | 8/1986 | European Pat. Off. . |
| 0 326 383 | 8/1989 | European Pat. Off. . |

*Primary Examiner*—Christopher Henderson
*Attorney, Agent, or Firm*—Wenderoth, Lind & Ponack

[57] ABSTRACT

Process for producing a dispersion, wherein dispersed slightly crosslinked polyvinyl seed particles are swollen with an ionizing liquid, said seed particles containing covalently linked ionizable groups causing a swelling of the seed particles by the ionizing liquid to form a dispersion of droplets, wherein the resulting droplets after the swelling have a volume which is at least five times that of the seed particles. Said ionizing liquid may be or contain a polymerizable monomer or be charged with such a monomer. Polymerization of the monomers is effected in the droplets during or after the swelling, to form polymer particles.

10 Claims, No Drawings

PROCESS FOR PREPARING A DISPERSION AND FOR PREPARING POLYMER PARTICLES

This invention relates to a method for preparation of a dispersion of droplets which may subsequently be used for preparation of polymer particles, e.g. by step-growth polymerization, using seed particles that are highly swellable in ionizing liquids as polymerization loci, and to the products so obtained.

BACKGROUND OF THE INVENTION

Polymer particles, in particular step-polymerized particles based on polymers such as phenolic polymers, have previously been prepared by using a water in oil emulsification technique, wherein the reactants are dissolved in water and the resulting aqueous solution is then dispersed in a water-insoluble organic liquid. Thereafter polymerization is started, e.g. by heating and/or by introduction of catalysts. After polymerization the particles are isolated and if desired redispersed in water.

The methods based on water-in-oil emulsions have several drawbacks. It may be difficult to perform both the polymerization and the isolation of final particles without getting aggregation and coalescence. Another problem is to prevent the polymerization from starting too early, i.e. it should not start before the water-in-oil emulsion has been prepared. When catalytic polymerization is used, it may be necessary to introduce the catalyst through the continuous outer organic phase into the water droplets. Such methods are not suitable when it is desired to have simple and reproduceable control of particle size, and are in particular not at all suited to the preparation of monodisperse systems, that is systems where all particles are of the same size.

SUMMARY OF THE INVENTION

The present invention seeks to avoid these drawbacks by first preparing a dispersion of droplets and then, if polymer particles are desired, effecting polymerization of monomers in said droplets.

Thus according to one aspect of the invention there is provided a method for preparing a dispersion wherein dispersed slightly crosslinked polyvinyl seed particles are swollen with an ionizing liquid, said seed particles containing covalently linked ionizable groups causing a swelling of the seed particles by the ionizing liquid to form a dispersion of droplets, wherein the resulting droplets after the swelling have a volume which is at least 5, particularly 10 times that of the seed particles.

According to another aspect of the invention there is provided a process for preparing polymer particles wherein dispersed slightly crosslinked polyvinyl seed particles containing covalently linked ionizable groups are swollen with an ionizing liquid which is or contains polymerizable monomers or is charged with such monomers to form a dispersion of droplets, and polymerization of the monomers is effected in the droplets during or after swelling to form polymer particles.

The ionizable groups are groups which are capable of forming ions (i.e. ionize) or they may be present in ionic form. Well known examples of such groups are acid and base groups and salts thereof, which will be further described below. The ionizing liquid, also called swelling liquid, is capable of ionizing the above ionizable groups and thereby swell the seed particles to which the ionizable groups are covalently linked.

In these methods the original seed particle typically constitutes only a small fraction, e.g. <20 and preferably <10 per cent by weight, of the final polymer particle.

Suitable seed particles consist of slightly crosslinked polyvinyl polymers carrying chemical groups that bring about a high degree of swelling in ionizing liquids.

Seed particles Containing acid or base groups may in addition to being highly swellable, act as catalytic centres in acid and base catalyzed polymerizations.

The method of the invention is especially suitable for the preparation of monodisperse particles.

DESCRIPTION OF THE PREFERRED EMBODIMENTS

Seed particles for use in the method may be prepared by, for example, radical polymerization of vinyl monomers using known methods such as emulsion polymerization, suspension polymerization or minisuspension polymerization in aqueous media.

The seed particles may also be formed by dispersion polymerization in organic liquids. The method of dispersion polymerization is described at length by K. E. J. Barrett ("Dispersion Polymerization in Organic Media", J. Wiley & Sons, London 1975). This method involves polymerization of monomers in an organic liquid which is a solvent for the monomer but not for the polymer formed, which precipitates as stable polymer particles due to the presence of a steric stabilizer. The process may be used for polymerization and copolymerization of a number of vinyl monomers and also allows the preparation of slightly crosslinked polymers.

Almost all the monomer will be monofunctional vinyl monomer, and crosslinking of the seed particles is obtained by using a small amount of polyfunctional vinyl monomer. The amount of crosslinker, e.g. polyfunctional vinyl monomer, which may be used in the present invention, is conveniently in the range 0.01 to 3% based upon the total weight of vinyl monomers.

The terms "monofunctional vinyl monomer" and "polyfunctional vinyl monomer" are used herein to describe a monomer containing a) one and b) two or more polymerizable double bonds respectively.

An especially useful method for seed preparation is the activated swelling method of Ugelstad (U.S. Pat. No. 4,459,378), which allows the preparation of monodisperse seed particles of predetermined sizes.

Covalently linked ionizable groups that contribute to a high degree of swelling of the seed particles in ionizing liquids may be introduced on the particles by postmodification procedures. Ionizable groups may also be present in the monomer used for seed preparation, and if necessary these groups may be temporarily protected during seed formation. Suitable groups include acid groups such as sulfonic acid groups, phosphonic acid groups or carboxylic acid groups, base groups such as tertiary amines or quaternary ammonium hydroxides, and salts of these acids and bases.

Seed particles may, for example, be prepared from styrene crosslinked with divinylbenzene. Another example is particles prepared in an aprotic solvent from acrylic esters crosslinked with divinylbenzene, where the seed particles after their preparation are treated with alkali causing the ester groups to hydrolyze and be converted into free acid groups.

Still another method for preparing seed particles involves copolymerization in an aprotic solvent of mixed anhydrides such as acrylic acid-acetic acid anhydride, or maleic and/or fumaric anhydride with styrene, and a small amount of divinylbenzene, and finally hydrolyzing the product.

In one embodiment of the invention polymerization takes place after the seed particles have been swollen with ionizing liquids to which the actual monomers to be polymerized have been added or are subsequently added.

Examples of suitable step-growth polymerizable monomers include furfurylalcohol, furfural, furfurylalcohol-formaldehyde, phenol-furfural, phenol-furfuryl-alcohol, resorcinol-formaldehyde, cresol-formaldehyde, phenol-formaldehyde, urea-formaldehyde, melamine-formaldehyde, epoxy compounds, epoxy-amine compounds and diisocyanate-polyhydroxy compound systems.

Anyone skilled in the art of step-growth polymerization may select suitable monomers and monomer mixtures. Useful information is given in: Comprehensive Polymer Science, The Synthesis, Characterization, Reactions & Applications of Polymers vol 5, Pergamon Press plc 1989.

The polymerization taking place inside the swollen particles may conveniently be brought about by heating and/or catalysis. In a preferred embodiment the polymerization is catalyzed by acid or base groups covalently bound to the polymer constituting the seed particles.

As an example of such acid catalyzed polymerization one prepares in a first step seed particles of polystyrene crosslinked with a small amount of divinylbenzene. The seed particles are then sulfonated in concentrated sulfuric acid, which usually gives about 1 sulfonic acid group per aromatic ring.

The sulfonated seed particles will swell in a given ionizing liquid to a degree determined by the sulfonic acid content and the degree of crosslinking.

For example a sulfonated polystyrene seed particle with a divinyl content of 0.1% may swell more than 200 times by volume in water. The swollen particles are almost large "water" droplets in a continuous water phase and are extremely difficult to observe by light microscopy unless phase contrast optics are used.

Although the ionizing liquid normally is a protic substance such as water, a high degree of swelling of seed particles carrying ionizable groups may also be obtained in dipolar aprotic solvents such as dimethylsulfoxide, hexamethylphosphoric amide and N,N-dimethylformamide.

If for example an aqueous solution of resorcinol and formaldehyde is mixed with sulfonated seed particles, the reaction between resorcinol and formaldehyde, which is acid catalyzed, will take place almost exclusively within the swollen particles. During the reaction the monomers are continuously transported into the particles where the polymerization reaction takes place.

Introducing sulfonic acid groups on monodisperse polystyrene particles of size 3.5 μm crosslinked with 0.1% divinylbenzene results in a seed that allows preparation of monodisperse spherical resorcinol-formaldehyde particles as large as 18 μm in size.

By starting with monodisperse particles of similar composition as above but of size 10 μm it is possible to prepare monodisperse resorcinol-formaldehyde particles of size ~60 μm.

Other examples of acid catalyzed polymerizations include preparation of monodisperse particles of urea-formaldehyde and of furfuryl alcohol polymers.

The principle described above with acid groups may be used in a similar manner in base catalyzed polymerization using seed particles with base groups such as tertiary amines or quaternary ammonium hydroxides. Seed particles with quaternary ammonium groups of the formula

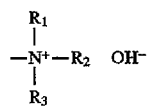

where $R_1$, $R_2$ and $R_3$ are alkyl, may be obtained by, for example, first preparing particles of slightly crosslinked poly-chloromethyl styrene, and then reacting these particles with a trialkyl amine of the formula

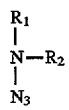

where $R_1$, $R_2$ and $R_3$ are as above, and finally with alkali. Such seed particles are for example suited for base catalyzed polymerization of phenolic compounds. Seed particles containing epoxy groups may also be prepared, and the epoxy groups are subsequently converted to ionizable groups, e.g. to sulfonic acid groups by reaction with bisulfite ions. The epoxy groups may also be converted to

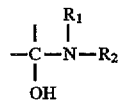

where $R_1$ and $R_2$ are alkyl groups, by reaction of the epoxy group with an amine of the formula

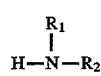

optionally followed by reaction with methyl iodide and then with alkali hydroxide leading to a group

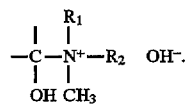

In a further embodiment of the invention swelling of the seed particles is effected by one or more of the monomeric reactants, which should have the required ability as ionizing liquid to act as a swelling agent.

An example is the swelling of dry seed particles carrying carboxylic acid groups with liquid epoxy compounds. In this case the polymerization also implies a reaction between epoxy groups and functional acid groups on the seed particles. The preparation of particles from glycidol is given to show the principle, where ionizing liquid and monomer is the same.

Another procedure implies that dry seed particles in a first step are dispersed in a non-swelling medium. Then one or more reagents, of which at least one have the ability to swell the seed particles, are introduced into the seed particles by diffusion through or from the suspending medium and into the seed particles. Other reactants which may be necessary to achieve a polymerization reaction may also be added to the continuous phase from which they will diffuse into the seed particles before or during polymerization. The polymerization reaction taking place may or may not be dependent upon catalytic effects of chemical groups on the seed particles. Examples of possible processes are the reaction between isocyanates and polyhydroxy compounds and the reaction between epoxy compounds and diamines.

In the Examples given below monosized seed particles are used. Since the subsequent swelling and polymerization are the same in each particle this leads to monodisperse particles as a final result. The monodisperse systems make it much easier to study model reactions and follow the swelling and polymerization process by optical microscopy.

However, there is a great general interest in monodisperse particles for various applications. As far as is known there is not described in the literature any method that will give monodisperse particles of controlled and predetermined size, e.g. from step reaction polymers. The size of the final polymer particle may be controlled by choice of the size and composition of the seed particle and the amounts of monomers employed.

The present invention represents the first general method making it possible to prepare monodisperse polymer particles from a great number of monomers, e.g. polymerizing by step-wise polymerization; such particles constitute a further feature of the invention.

According to a still further aspect of the invention it has been found that especially resorcinol-formaldehyde particles are very suitable for the preparation of carbon particles. By carrying out pyrolysis of monodisperse resorcinol-formaldehyde particles, e.g. in an inert atmosphere at 1000° C., spherical monodisperse carbon particles are obtained. These particles also constitute a further aspect of the invention.

EXAMPLE 1

Seed particles of size 3.5 µm with —$SO_3^-H^+$ groups

Monodisperse particles of size 3.5 µm of polystyrene crosslinked with 0.1 weight % divinylbenzene were prepared by the activated swelling method of Ugelstad.

An aqueous dispersion of such 3.5 µm PS/DVB particles with a solids content equal to 20 g was filtered by suction and washed with 200 ml of methanol on the filter. The wet particles were taken from the filter and dispersed with stirring in 600 ml concentrated sulfuric acid=(95–97%) at 24° C. The dispersion was stirred at 80° C. for 2 hours and then at 100° C. for 2 hours. The hot dispersion was poured into crushed ice, diluted with water and centrifuged. The particles were redispersed in water and centrifuged several times until the pH of the supernatant was about 6. The final dispersion had a solid content of 0.54% and comprised swollen morodisperse droplets of diameter 20 µm.

EXAMPLE 2

Seed particles of size 10 µm with —$SO_3^-H^+$ groups

Monodisperse particles of size 10 µm of polystyrene crosslinked with 0.1 weight % divinylbenzene were prepared according to the activated swelling process of Ugelstad.

6 g of dry beads from the above preparation were dispersed in 200 ml concentrated sulfuric acid under stirring and heated to 80° C. for 7 hours. Then the bead slurry was cooled, mixed with 3 l of ice-cold methanol and left to permit sedimentation. The settled material was repeatedly washed with methanol until the methanol phase showed an almost neutral pH. Then the sulfonated seed particles were dried in air. They agglomerated in the dried state but behaved as single free monodisperse droplets when redispersed in water. The droplet diameter in water was 70 µm.

The dry sulfonated seed particles of size 10 µm from above were similarly redispersed in dimethyl sulfoxide. The particles swelled to a diameter of appr. 70 µm.

EXAMPLE 3

Seed particles of size 3.5 µm with

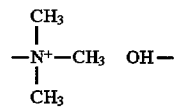

groups

Monodisperse particles of size 3.5 µm of polychloromethyl styrene crosslinked with 0.1 weight % divinylbenzene were prepared according to the activated swelling process of Ugelstad.

5 g of the above particles taken as a 20% aqueous dispersion were mixed with 200 ml aqueous trimethylamine solution (37%) and kept at ambient temperature for 24 hours. The excess trimethylamine was then driven off under vacuum and the particles treated with 200 ml 0.5N NaOH solution. Finally, the particles were repeatedly washed with water in a settling redispersion procedure until the used water became neutral. The droplet size in water was 12 µm.

EXAMPLE 4

Seed particles of size 2.7 µm with —COOH groups 55 g of monodisperse poly(butylacrylate-divinylbenzene) particles (0.1 weight % DVB) of size 3 µm were dispersed in 900 ml of a solution containing 10% KOH in water/2-propanol (4:1) and kept at 80° C. under stirring for 24 hours. The suspension was cooled to ambient temperature, diluted with an equal volume of methanol and allowed to settle. The particles were repeatedly washed with methanol and sedimented between each washing until the methanol phase had a pH of ~7. Finally the particles were washed with acetone and hexane and then dried in air. The particle diameter was 2.7 µm. When redispersed in water the particles swelled to droplets of 11.8 µm.

EXAMPLE 5

Preparation of resorcinol-formaldehyde particles

To 185 g of the dispersion of sulfonated monodisperse seed particles from Example 1, with a dry weight of particles equal to 1 g, was added 1.8 l of water, 225 g of resorcinol and 680 g of 37% formaldehyde solution. The mixture was heated at 65° C. under stirring for 2.5 hours to give monodisperse resorcinol-formaldehyde particles of size 18 µm. The reaction mixture was diluted with dioxane and the particles allowed to settle overnight. The particles were redispersed and sedimented several times in water until the water phase was free of fines. Finally the particles were freeze dried.

EXAMPLE 6

Preparation of monodisperse resorcinol-formaldehyde particles

To 185 g of the dispersion of sulfonated monodisperse seed particles from Example 1, with a solids content equal to 1 g, was added 0.9 l of water, 452 g of resorcinol and 1355 g of 37% formaldehyde solution. The mixture was heated at 65° C. for 2.5 hours under stirring. To isolate the particles the same procedure was followed as in Example 5. The particle size obtained was also in this case 18 µm, reflecting the maximum swelling capacity of the seed particles.

EXAMPLE 7

Preparation of monodisperse resorcinol-formaldehyde particles 100 ml of the dried particles from Example 2 of size 10 µm were dispersed in a solution containing 150 ml water, 20 g resorcinol and 60 g formaldehyde solution (37%). The resulting mixture was kept at 70° C. for 1.5 hours under stirring. After cooling to ambient temperature the particles were separated from the reaction mixture and washed with water on a sieve of mesh size 37 µm. The particles had a diameter of 68 µm in water and shrank somewhat in air to 61 µm diameter.

EXAMPLE 8

Preparation of monodisperse resorcinol-formaldehyde particles 0.05 g of 3.5 µm monosized particles with quaternary base groups from Example 3 was dispersed in a solution containing 50 ml water, 15 g resorcinol and 45 g of 37% formaldehyde solution. This mixture was kept at 65° C. for 2 hours. Monodisperse resorcinol-formaldehyde particles of size 8.2 µm were formed.

EXAMPLE 9

Preparation of monodisperse resorcinol-formaldehyde particles 0.05 g of dried particles of size 3.5 µm with quaternary base groups from Example 3 was dispersed in 50 g toluene in presence of a steric stabilizer (H-190-332 from ICI). Then 0.4 g resorcinol and 0.6 g of 37% formaldehyde solution were added. After stirring for 5 hours, at 25° C., particles of size 6.4 µm were formed.

EXAMPLE 10

Preparation of monodisperse resorcinol-formaldehyde particles 0,1 g of dried particles of size 3.5 µm with quaternary base groups from Example 3 was dispersed in 60 g toluene in the presence of a steric stabilizer (H - 190 - 332 from ICI). Then a mixture of 1.0 g resorcinol in 2.0 g of 37% formaldehyde solution was added under stirring. After 5 hours at 50° C. monodisperse particles of size 8.3 µm had been formed.

EXAMPLE 11

Preparation of monodisperse furfuryl alcohol particles 100 mg of dried particles from Example 2 of size 10 µm with sulfonic acid groups were wetted with a small amount of water to become a wet paste. This paste was dispersed in 10 ml furfuryl alcohol under stirring and the polymerization started by increasing the temperature to 70°0 C., where it was kept for 15 minutes. The particles were isolated by washing and sedimentation several times in acetone. The final particle diameter was 24 µm.

EXAMPLE 12

Preparation of monodisperse urea-formaldehyde particles 100 mg of particles from Example 2 of size 10 µm with sulfonic acid groups were dispersed in 10 g of water. To this dispersion was added 10 g urea-formaldehyde glue (Dyno L-103) and this mixture kept at 50°–55° C. under stirring for 2 hours. Monodisperse particles of size 50 µm were isolated on a 37 µm sieve, and washed several times with water. On drying the particles shrank to 45 µm,

EXAMPLE 13

Preparation of particles from methylene-bis (phenyl isocyanate) (MDI)

0.1 g of dried particles from Example 2 of size 10 µm were dispersed in 50 ml toluene containing 0.5 g of a steric stabilizer, H 190-332 from ICI. Then 0.7 g of water dispersed in a mixture of 50 ml toluene and 0.5 g H 190-332 was added. Under stirring the water swelled completely into the particles. Finally 0.75 g methylene bis (phenyl isocyanate) dispersed in a mixture of 18 ml toluene and 0.2 g H 190-332 was added. The particles swelled to >100 µm with $CO_2$ evolution due to reaction between water (ionizing liquid) and MDI (monomer), and the polymer skin around them ruptured somewhat and gave a rough surface. The particles collapsed and the final size was about 22 µm.

EXAMPLE 14

Preparation of particles from methylene-bis (phenyl isocyanate) (MDI) and glycol Toluene containing 1 weight % of steric stabilizer H 190-332 (ICI) was divided into four equal portions of 25 ml. In these portions were separately dispersed (1) 0.1 g of dried particles from Example 2, (2) 0.1 g of water, (3) 0.7 g of ethylene glycol and (4) 2.4 g of MDI. First (1) and (2) were mixed, then (3) was added and lastly (4).

The particles swelled to ~20 µm after addition of the dispersion containing water and ethylene glycol. When MDI was added the particles swelled enormously due to $CO_2$ evolution. The particle surface ruptured, finally producing particles of size 25 µm with a very rough surface.

EXAMPLE 15

Preparation of monodisperse particles from glycidol 0.1 g of dried seed particles from Example 4 of size 2.7 µm carrying carboxylic acid groups were dispersed under stirring in 10 ml of glycidol. Within a few minutes the glycidol caused the particles to swell to about 9 µm. The stirring was continued at 25° C. for 20 hours causing an acid catalyzed polymerization of the glycidol also implying a reaction between epoxy groups and carboxylic acid groups on the seed particles. After 20 hours particles of polymerized glycidol of size 6.4 µm was obtained.

EXAMPLE 16

Preparation of carbon particles

A sample of 5 g of the freeze dried monodisperse particles from example 5 of size 18 µm were placed in a graphite crucible and pyrolized for 4 hours at 1000° C. in an oven under argon atmosphere. Monodisperse carbon particles of size 14.5 µm with a specific surface area of appr. 600 $m^2/g$ measured by BET were obtained. The particles showed electrical conductivity.

We claim:

1. Process for producing polymer particles from step-growth polymerizable monomers which comprises:
    a) swelling dispersed, slightly crosslinked polyvinyl seed particles with an ionizing liquid which is protic or dipolar aprotic, said seed particles containing covalently linked ionizable groups which are acidic or basic or salts thereof to form a dispersion of droplets, whereby the resulting droplets after the swelling have a volume which is at least five times that of the seed particles, and wherein the ionizing, swelling liquid which swells the seed particles to form droplets, comprises a step-growth polymerizable monomer, and b) step-growth polymerizing the monomers in the droplets to form polymer particles.

2. The process according to claim 1, wherein the step-growth polymerization of step b) is effected by the ionizable groups on the particles acting as catalyst for the polymerization to form polymer particles.

3. The process according to claim 1, wherein the ionizable groups on the particles act as co-reactants.

4. The process of any one of claims 1 to 3, wherein the monomers are resorcinol and formaldehyde.

5. The process of any one of claims 1 to 3, wherein the monomer is furfuryl alcohol.

6. The process according to any one of claims 1 to 3, wherein the monomers introduced contain epoxy groups.

7. The process according to claim 1, wherein a dispersion of seed particles carrying ionizable groups in a non-ionizing liquid is swollen with said ionizing liquid.

8. The process of claim 7, wherein the polymerization is effected by the ionizing groups on the particles acting as catalyst for the polymerization to form polymer particles.

9. The process according to any one of claims 7 to 8, wherein the ionizable groups on the particles act as co-reactants.

10. The process according to claim 1 wherein the seed particles are monodisperse to obtain monodisperse droplets and monodisperse polymer particles.

* * * * *